(12) United States Patent
Datig

(10) Patent No.: US 6,233,546 B1
(45) Date of Patent: May 15, 2001

(54) METHOD AND SYSTEM FOR MACHINE TRANSLATION USING EPISTEMIC MOMENTS AND STORED DICTIONARY ENTRIES

(76) Inventor: William E. Datig, 6 Harrison Dr., Northport, NY (US) 11763

( * ) Notice: Subject to any disclaimer, the term of this patent is extended or adjusted under 35 U.S.C. 154(b) by 0 days.

(21) Appl. No.: 09/195,040

(22) Filed: Nov. 19, 1998

(51) Int. Cl.$^7$ ..................................................... G06F 17/28
(52) U.S. Cl. ......................................................... 704/7; 704/9
(58) Field of Search ................................. 704/2, 3, 4, 5, 704/6, 7, 8, 9; 707/536

(56) References Cited

U.S. PATENT DOCUMENTS

| | | | |
|---|---|---|---|
| 4,286,330 | | 8/1981 | Isaacson ................................. 712/223 |
| 5,323,311 | * | 6/1994 | Fukao et al. ............................. 704/2 |
| 5,481,700 | | 1/1996 | Thuraisingham ......................... 707/9 |
| 5,495,413 | * | 2/1996 | Kutsumi et al. .......................... 704/4 |
| 5,612,872 | * | 3/1997 | Fujita ..................................... 704/2 |
| 5,632,022 | | 5/1997 | Warren et al. ......................... 345/350 |
| 5,659,765 | * | 8/1997 | Nii .......................................... 704/4 |
| 5,844,798 | * | 12/1998 | Uramoto ................................. 704/2 |
| 5,907,821 | * | 5/1999 | Kaji et al. ................................ 704/4 |

OTHER PUBLICATIONS

PCT International Search Report, Date of Mailing Oct. 28, 1998, Int'l. Appln. No. PCT/US98/08527, Int'l. Filing Date Apr. 27, 1998, Applicant: William E. Datig. (3 pgs.).

Hovy, Eduard, "How MT Works", *Byte*, vol. 18, No. 1, Jan. 1993, pp. 167–176.

Simmons, R.F., "Technologies for Machine Translation", *Future Generations Computer Systems*, vol. 2, No. 2, Jun. 1986, pp. 83–94.

Slocum, Jonathan, "Machine Translation: An American Perspective", *Proceedings of the IEEE*, vol. 74, No. 7, Jul. 1986, pp. 969–978.

Arnold, Doug, "Eurotra: A European Perspective on MT", *Proceedings of the IEEE*, vol. 74, No. 7, Jul. 1986, pp. 979–992.

* cited by examiner

*Primary Examiner*—Joseph Thomas
(74) *Attorney, Agent, or Firm*—McDermott, Will & Emery

(57) ABSTRACT

A source signal embodying knowledge is decomposed into a simple and regular internal representation of a decomposition of epistemic instances of the knowledge. An epistemic instance is a fundamental semantic structure that expresses a transformation of two objects. The internal representation is then transformed into another internal representation from which a target signal is constructed. The complexity of language is localized within rules for decomposing the source signal into the internal representation and rules for transforming the internal representation into another internal representation. In one embodiment, source signal decomposition and target signal constructions are facilitated by look ups into a universal dictionary.

24 Claims, 8 Drawing Sheets

METHOD AND SYSTEM FOR MACHINE TRANSLATION USING EPISTEMIC MOMENTS AND STORED DICTIONARY ENTRIES

RELATED APPLICATIONS

The present application contains subject matter related to the following co-pending applications:

U.S. application Ser. No. 08/847,230 entitled "Universal Epistemological Machine (a.k.a. Android)," filed on May 1, 1997 by William E. Datig (docket no. MAM 188), the contents of which are hereby incorporated by reference herein;

U.S. application Ser. No. 08/876,378 entitled "Universal Machine Translator of Arbitrary Languages", filed on Jun. 16, 1997 by William E. Datig (docket no. MAM288), the contents of which are hereby incorporated by reference herein; and U.S. application Ser. No. 09/033,676 entitled "Universal Machine Translator of Arbitrary Languages", filed on Mar. 3, 1998 by William E. Datig (docket no. MAM388), the contents of which are hereby incorporated by reference herein.

FIELD OF THE INVENTION

The present invention relates to machine translation and, more particularly, to a universal translation system applicable for transforming signals that embody knowledge according to a knowledge representation, such as a natural language.

BACKGROUND OF THE INVENTION

There is a long felt need for a reliable, high-quality language translation system. The increasing internationalization and globalization of the world's economies continues to bring many different people together who speak different languages for business. A significant cost and obstacle, however, continues to be the requirement to translate documents and spoken words from one language to another. In particular, it is difficult to find competent and affordable translators who are both fluent in the desired languages and can understand the subject matter as well. Researchers have been investigating for some time whether and how translation of natural and artificial languages can be automated.

Perhaps the single most difficult impediment to a high-quality automated language translation system is the sheer complexity of the world's human languages. Human languages are notoriously complex, especially in their vocabularies and grammars. Conventional attempts to perform machine translation, however, have not been able to manage this complexity very well.

According to one approach, such as that described in U.S. Pat. No. 4,706,212, software routines are hard-coded to translate sentences in a source language to sentences in a target language. In particular, the complexity of the grammar of the source and target languages is handled by various ad-hoc, hard-coded logic. For example, U.S. Pat. No. 4,706,212 discloses logic for recognizing some grammatical constructions in English as a source language and outputting a Russian construction. The logic devised for recognizing and translating these source grammatical constructions, however, is tightly coupled to a particular source language. As a practical matter, most of the subroutines coded to handle English source construction are utterly inapplicable for another language such as Chinese. Therefore, extending such conventional translation systems to handle a new source or target language requires a virtual re-implementation of the entire system. Furthermore, since the hard-coded logic is often quite complicated, it is difficult and expensive to debug and maintain, especially to improve the quality of the language translation.

Since handling grammatical rules by special purpose subroutines is difficult to debug, maintain, and extend, other conventional attempts have attempted to circumvent the above difficulties by utilizing complicated internal data structures to represent the text under translation. For example, U.S. Pat. No. 5,528,491 describes a system in which a graph of possible interpretations is produced according to grammar rules of a specific source language, such as English. In general, these data structures are quite complex with a variety of node types for different grammatical constructions, especially if such a system attempts to implement the principles of Noam Chomsky's transformational grammar. Since each language employs different grammatical constructions, the data structure for one language is often not usable for another language.

Another example of a complicated internal data structure is an interlingua, which is an artificial language devised for representing a superset of the source and target languages. Such an approach is described, for example, in U.S. Pat. No. 5,426,583. In order to be useful, the interlingua must be designed to include all the features of the source and target languages. Thus, if capability for a new language is to be added to an interlingual system, then the interlingua typically needs to be upgraded, requiring modification to the routines that translate to and from the interlingua. Other conventional approaches, such as U.S. Pat. No. 5,477,451, employ complex statistical or mathematical models to translate human text.

In general, conventional approaches at best manage the complexity of language in an ad-hoc instead of a systematic manner. As a result, it is difficult to extend such conventional systems to support a new language. Furthermore, such techniques are even more difficult to apply in mixed language situations, including, for example, computer programming languages embedded in a natural language context. Another drawback is that such systems are difficult to debug and therefore difficult to tweak to achieve high-quality translations.

SUMMARY OF THE INVENTION

There has long been a need for reliable, high quality, automated language translation. The necessity for a language translation system that is readily extensible to new human languages is apparent. There is also a need for a language translation system and methodology that are capable of handling mixed-language texts, especially those texts that also include an artificial language, such as a programming language.

These and other needs are addressed by the present invention, in which a source signal embodying knowledge is decomposed into a simple and regular internal representation. This internal representation is then transformed into another internal representation from which a target signal is constructed. Despite the simplicity of the internal representation, the complexity of language is appropriately localized within rules for decomposing the source signal into the internal representation and transforming the internal representation into another internal representation. In one embodiment, source signal decomposition and target signal constructions are facilitated by look ups into a universal dictionary. Advantageously, extending and improving such a language translation system involves updating the universal dictionary, the decomposition rules, and the mapping rules, thereby avoiding modification of hard-coded logic and internal data structures.

Accordingly, one aspect of the invention relates to a method and a computer-readable medium bearing instructions for translating a source signal embodying information according to a source language into a target signal embodying information according to target language. The methodology involves analyzing the source signal to produce a first internal representation of epistemic instances corresponding to the information embodied in the source signal. The epistemic instances are fundamental semantic structures expressing a transformation of two objects or objective grammatical forms. The first internal representation is transformed into a second internal representation of epistemic instances according to the target language, and the target signal is constructed based on the second internal representation.

In various embodiments, the source language and the target language may be any of a natural language, a computer language, formatting conventions, and mathematical expressions. The source signal and the target signal can be realized as digital signals representing text, acoustic signals representing speech, optical signals representing characters, and as any other analog or digital signal. The described methodology is also applicable to transforming a source signal embodying information according a knowledge representation relating to a knowledge discipline, for example, physics and engineering.

According to another aspect of the invention, a method and computer-readable medium bearing instructions for translating a source signal embodying information according to a source language into a target signal embodying information according to target language involve storing related dictionary entries in a computer-readable medium. Each related dictionary entry includes a source word form, a source grammatical form, a corresponding target word form, and a target grammatical form for the target word form. The grammatical form in some embodiments relates to a sub-grammatical form for specifying the morphology of a word form including grammatical inflection and auxiliaries. The source signal is analyzed to produce a first internal representation of the information embodied in the source signal based on the dictionary entries. The first internal representation is transformed into a second internal representation according to the second internal representation, from which the target signal is constructed. Advantageously, the dictionary entries properly localize much of the complexity language. Word forms in the dictionary entries may correspond to one or multiple lexical words interspersed throughout a sentence.

In accordance with one feature, the source signal is analyzed by applying decomposition rules that describe how to partition the word forms in the source signal into three data sets constituting a triplet. One advantage of a triplet data structure is that it can provide a straightforward representation of an epistemic instance. According to another feature, at least some of the triplets in the first internal representation are mapped to produce the second internal representation by accessing a sequence of mapping rules. The mapping rules describe a correspondence between a source language triplet and a corresponding target language triplet.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Figure 1:
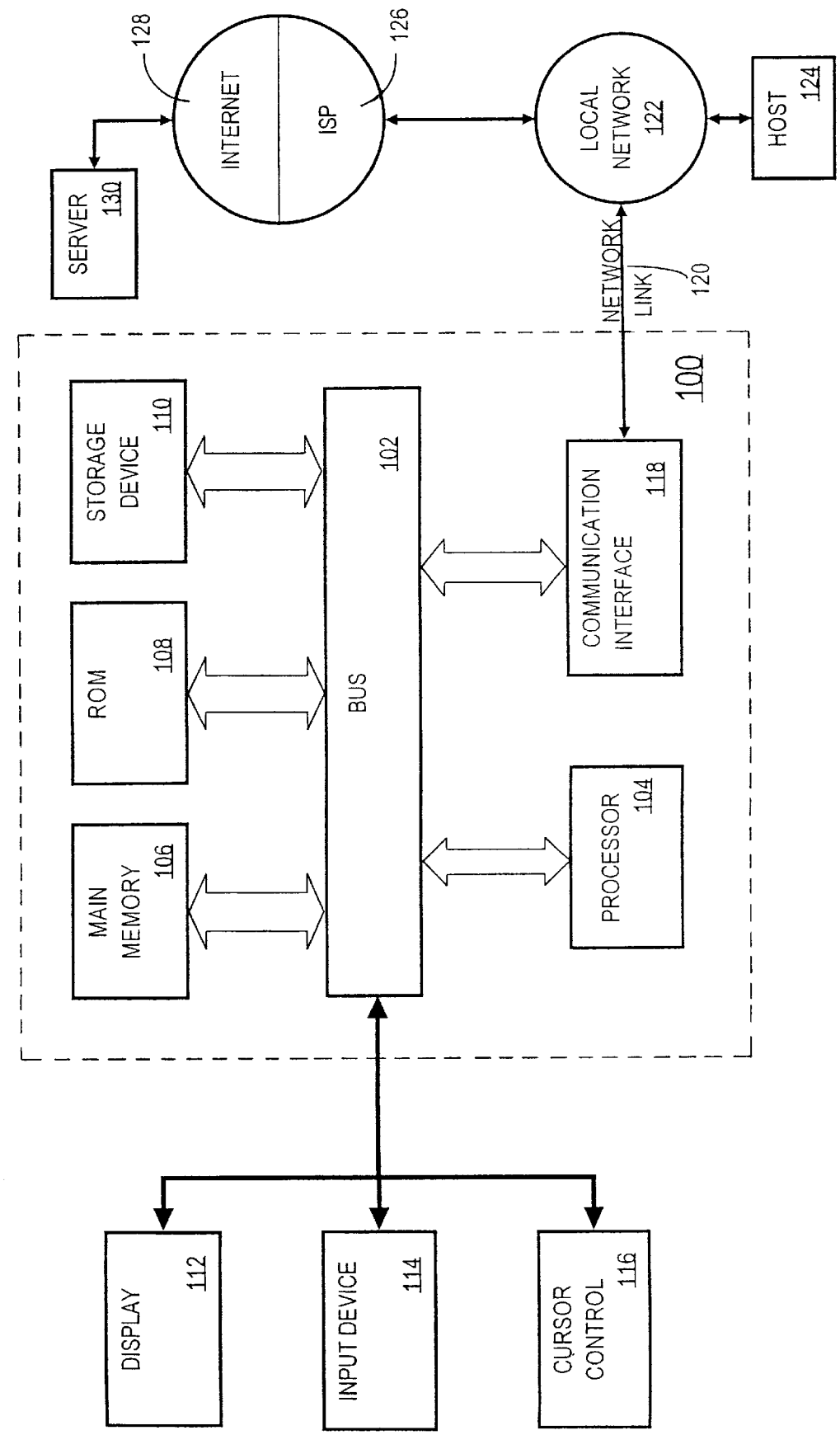
FIG. 1 schematically depicts a computer system upon which an embodiment of the present invention can be implemented.

A method and apparatus for language translation are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

THEORETICAL OVERVIEW

The present invention stems from the realization that there is a common, regular model for all languages and indeed any knowledge representation. This common model is referred to as a "universal grammar." A universal grammar differs from an interlingua, because a universal grammar presents a simple, regular semantic construction of information, while an interlingua is an eclectic conglomeration of grammatical and syntactical surface features of various human languages. A universal grammar is described in more detail in U.S. application Ser. No. 09/033,676.

In accordance with this model, there is a simple and universal means of expressing the information communicated by any language and, in fact, expressing all knowledge. This universal means of expression is referred to herein as a decomposition into "epistemic instances." An epistemic instance, which underlies all moments of a being's consciousness and perceptions, is a semantic structure of the meaning of any moment of any language.

In essence, an epistemic instance expresses a transformation of two objects. In a linguistic context, the transformation is referred to herein as the "metaverb" and usually corresponds to lexical objects in a human language involving actions or relationships, such as verbs, prepositions, and conjunctions. The objects are referred to herein as "metanouns" and usually correspond to lexical objects involving things or concepts as nouns, pronouns, determiners, and adjectives. Lexical objects include words, phrases, clauses, sentences, grammatical segments, textual ideas, acoustic phones and phonemes, character strokes of alphabetic letters and Chinese characters, and any other component of meaning. Many metaverbs and metanouns can be further decomposed into one or more epistemic instances, expressing a transformation of objects.

For example, in the English clause "I have read the book under the table," the verb "have read" is the metaverb and the subject pronoun "I" is the first metanoun and the object noun phrase "the book under the table" is the second metanoun, because "I" and "the book under the table" undergo a transformation with each other by reading. The second metanoun, "the book under the table" can be further decomposed into "the book" and "the table" transforming through "under." Here, the metaverb "under" pertains to how "the book" and "the table" are interrelated.

Since all information represented by a language (and indeed all knowledge as explained hereinafter) can be decomposed into epistemic instances and since each epistemic instance comprises a metaverb and two metanouns, it follows that any linguistic sentence can be internally represented with a simple data structure comprising a set of three elements that may be decomposed into other three element sets. In contrast with some conventional attempts, this internal representation is simple and regular, involving decompositions of three element epistemic instances, and is therefore applicable without change to any human language and readily manipulated in a machine such as a computer. As a result, the translation system is readily extensible to new languages.

Accordingly, the universal grammar provides the necessary direction for properly localizing the complexity of language. Since linguistic utterances have a simple, regular underlying structure, it follows that the complexity inherent in human language must located elsewhere. More specifically, a universal dictionary is provided for handling the different shades of meaning and grammatical functions each word has, a sequence of split (or decomposition) rules is provided for breaking down a word stream in a decomposition of epistemic instances, and a sequence of mapping rules is provided for mapping the epistemic instances relating to moments of the source language into the epistemic instances relating to moments of the target language. Localizing the complexity within a universal dictionary, split rules, mapping rules, and reconstruction rules allows linguists who are not computer programmers to easily upgrade, extend, and even tweak the language translation system to produce an extensible, reliable, high-quality language translation system.

HARDWARE OVERVIEW

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for language translation. According to one embodiment of the invention, language translation is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for language translation as described herein. The received code may be executed by processor 104 as it is received, and/or stored in storage device 110, or other non-volatile storage for later execution. In this manner, computer system 100 may obtain application code in the form of a carrier wave.

It is to be understood that embodiments of the present invention are not limited to electronic computing machines, but may also be implemented on optical, biological, and quantum-state computing devices or any combination thereof as these devices become practical in the future. In fact, the present invention may be implemented by a suitably constructed android such as what is disclosed in the co-pending patent application, U.S. Ser. No. 08/847,230.

TRANSLATION SYSTEM OVERVIEW

Figure 2:
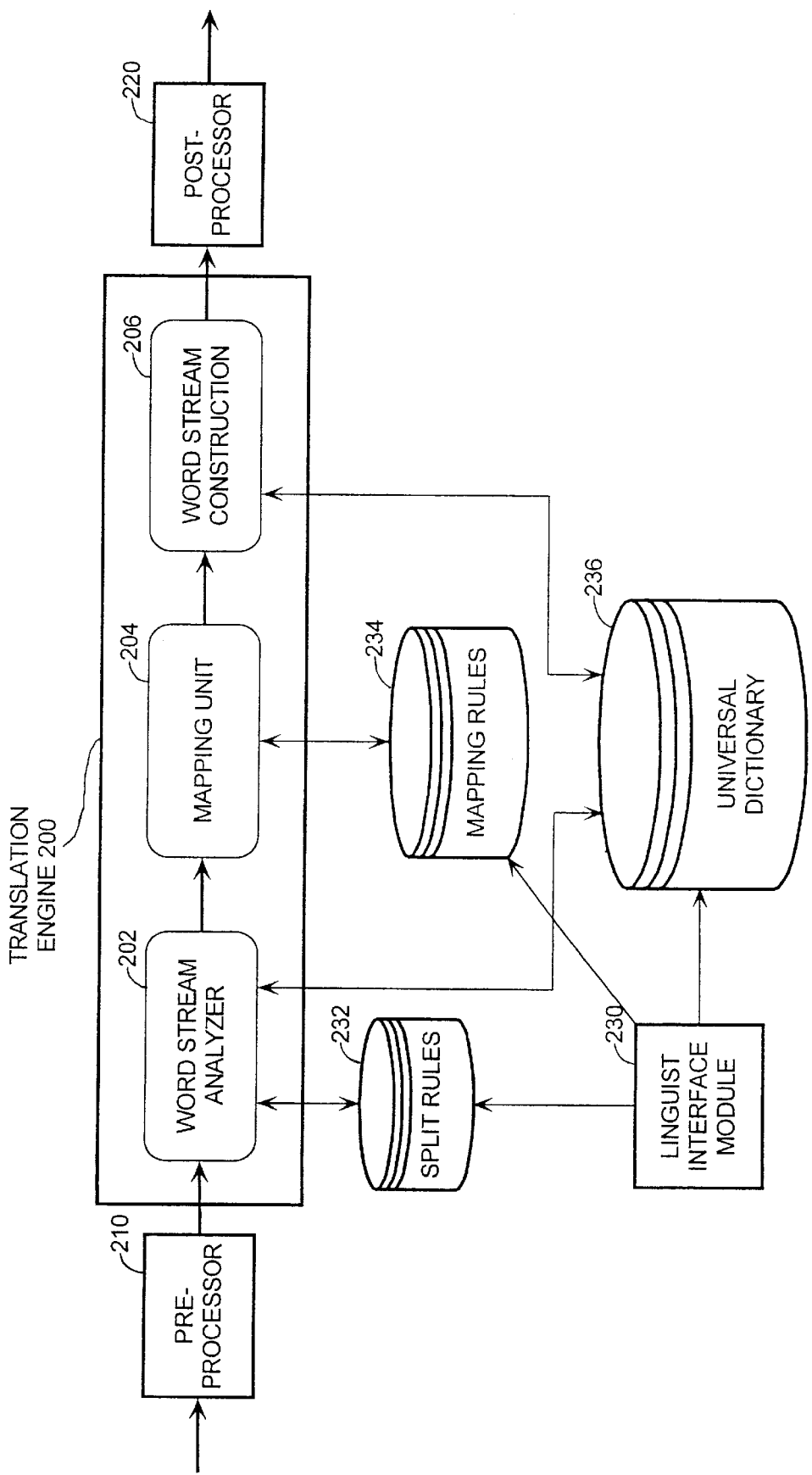
FIG. 2 schematically depicts components of a universal language translation system.

FIG. 2 is a schematic diagram of one embodiment of a translation system. The translation system comprises a translation engine 200 which is preferably implemented on a computer system as described hereinabove. The translation engine 200 includes three modules: a word stream analyzer 202 for decomposing a word stream in the source signal into an internal representation, a mapping unit 204 for transforming the internal representation, and a word stream construction module 206 for converting the transformed internal representation into a target signal.

Since the translation engine 200 preferably operates on digital signals, a preprocessor 210 and a postprocessor 220 are provided to accommodate the conversion of acoustic, optical, tactile, and other sensory media into "word forms" in the translation engine's preferred digital medium. The preprocessor 210 and postprocessor 220 may be implemented by several techniques, such as standard speech recognition and standard optical character recognition, by another instantiation of a suitably configured translation engine as described in detail hereinafter, or by any combination of such techniques.

The translation engine 220 is preferably configured by linguists with a data-driven programming process implemented in a linguist interface module 230. The linguist interface module 230 provides a graphical user interface as a front end to enable a linguist or other language expert to enter, correct, and update entries in the sequence of split rules 232, mapping rules 234, and the universal dictionary 236.

The universal dictionary 236 contains related entries for words in both the source and target languages. TABLE 1 illustrates some entries in one implementation of the universal dictionary 236. Corresponding words in the universal dictionary are identified by a common key value. For example, the English word "book", the Chinese word "shū", and the Italian word "libro" all have the same key value. Furthermore, each of these words have a grammatical form code (GF Code) of R0 for noun. The same word form may be present in more than one entry, in which case the word is semantically or grammatically ambiguous. For example, the English verb "read" is ambiguous, because it can correspond to the intransitive Chinese verb "dú'shū" (GF Code H2) as in "I read" or to the transitive Chinese verb "yuèlǎn" (GF Code H1) as in "I read the book." These ambiguities are handled according to techniques that are described in more detail hereinafter.

TABLE 1

SAMPLE ENTRIES IN UNIVERSAL DICTIONARY 236

| Key | Language | Word Form | GF Code |
|---|---|---|---|
| 123456 | English | book | R0 |
| 123456 | Chinese | shu | R0 |
| 123456 | Italian | libro | R0 |
| 345672 | English | read | H2 |
| 345672 | Chinese | dushu | H2 |
| 345672 | Italian | leggere | H2 |
| 345673 | English | read | H1 |
| 345673 | Chinese | yuelan | H1 |
| 345673 | Italian | leggere | H1 |
| 238474 | English | I | S1 |
| 238474 | Chinese | wo | S1 |
| 238474 | Italian | io | S1 |

The grammatical form code (GF Code) identifies what functional part of speech the word form belongs to. For example, a GF Code of H1 specifies a transitive verb and a GF code of H2 specifies an intransitive verb. The grammatical forms will be later used within the word stream analyzer 202 for decomposing the incoming word stream. TABLE 2 lists exemplary grammatical form codes, in which related grammatical form codes share common prefix, thereby allowing for wildcard matching of grammatical forms.

TABLE 2

SAMPLE GRAMMATICAL FORM CODES

| GF Code | Description |
| --- | --- |
| Q0 | Adjective |
| Q1 | Verbal Adjective-Past Participle |
| Q2 | Verbal Adjective-Present Participle |
| I0 | Adverb |
| I1 | Conjunctive Adverb |
| I2 | Disjunctive Adverb |
| I3 | Adjunct Adverb |
| P0 | Article |
| P1 | Definite Article |
| P2 | Indefinite Article |
| G0 | Conjunction |
| G1 | Coordinating Conjunction |
| G2 | Correlative Conjunction |
| G3 | Subordinating Conjunction |
| G4 | Coordinating Pronoun |
| O0 | Determiner |
| O1 | Possessive Determiner |
| O2 | Predeterminers |
| O3 | Postdeterminers |
| O4 | Quantitative Determiner |
| N0 | Final Particle |
| N1 | Demonstrative Particle |
| N2 | Limitative Particle |
| N3 | Emphatic Particle |
| N4 | Definite Particle |
| N5 | Affirmative Particle |
| N6 | Negative Particle |
| N7 | Interrogative Particle |
| N8 | Exclamatory Particle |
| N9 | Indecisive Particle |
| N10 | Comparative Particle |
| N11 | Auxiliary Particle |
| N12 | Korean Nominative Particle |
| N13 | Korean Dative Particle |
| N14 | Korean Accusative Particle |
| N15 | Korean Locative Particle |
| N16 | Korean Instrumental Particle |
| N17 | Korean Auxiliary Particle |
| N18 | Korean Connective Genitive Particle |
| R0 | Noun |
| R1 | Proper Noun |
| R2 | Common Count Noun |
| R3 | Common Non-count Noun |
| R4 | Verbal Noun-Past Participle |
| R5 | Verbal Noun-Present Participle |
| M0 | Preposition |
| S0 | Pronoun |
| S1 | Personal Pronoun |
| S2 | Reflexive Pronoun |
| S3 | Possessive Pronoun |
| S4 | Interrogative Pronoun |
| S5 | Relative Pronoun |
| S6 | Demonstrative Pronoun |
| S7 | Reciprocal Pronoun |
| S8 | Universal Pronoun |
| S9 | Partitive Pronoun |
| C0 | Sentence Link |
| H0 | Verb |
| H1 | Transitive Verb |
| H2 | Intransitive Verb |
| H3 | Ditransitive Verb |
| H4 | Complex Transitive Verb |
| H5 | Stative Transitive Verb |
| H6 | Stative Intransitive Verb |
| H7 | Dynamic Transitive Verb |
| H8 | Dynamic Intransitive Verb |
| H9 | Copular Verb |

TABLE 2-continued

SAMPLE GRAMMATICAL FORM CODES

| GF Code | Description |
| --- | --- |
| H10 | Co-verb Verb |
| H11 | Reflexive Verb |
| H12 | Impersonal Verb |
| H13 | Modal Verb |
| H14 | Auxiliary Verb |
| H15 | Korean Adjectival Verb |
| H16 | Korean Compound Verb |

Preferably, special word formations are also identified. A special word formation is a group of individual words that semantically or grammatically act together as one. One way to identify a special word formation is to populate the universal dictionary 236 with an entry for one of the words of the word formation in order to trigger an ambiguity, thereby causing an ambiguity resolution routine to be executed. Executing the ambiguity resolution routines examines other word forms in the word stream to determine whether there is a special word formation. Some examples of special word formations include abbreviations, acronyms, words with apostrophes, proper nouns, non-translatable words (e.g. $X_1$), special hyphenated noun and adjective compounds, special unhyphenated noun and adjective compounds, special verbs with auxiliaries, special adjectival expressions, special adverbial expressions, special prepositional expressions, idioms, Chinese multiple character words (ci), Arabic character words, French (and other) merged-vowel words, German and Dutch compound nouns and adjectives, cardinal and ordinal numbers, mathematical constructions, and other special-case words of human language such as Chinese measure words.

The grammatical form system described hereinabove may be augmented by a sub-grammatical form table (not shown). A sub-grammatical form is a specialization of a grammatical form that further specifies the morphology or inflection of the word form appropriate to the grammatical form. For example, a sub-grammatical form for a Latin adjective would be a combination of its case, number, and gender, for example nominative feminine singular. Sub-grammatical forms for a particular word form can be stored in a matrix form, wherein the columns correspond to verb tenses/voices/moods and noun cases, and the rows correspond to verb persons/numbers and noun genders/numbers/articulations. Sub-grammatical forms can also be identified from a group of word forms, such a verb and its auxiliaries.

The mapping rules 234 specify how to transform the internal representation suitable for a source language into an internal representation suitable for a target language. TABLE 3 depicts exemplary mapping rules that are used to transform an English prepositional phrase into a Chinese prepositional phrase among other transformations. Generally, an adjectival prepositional phrase in English of the form "X prep. Y" corresponds the Chinese prepositional phrase "Y prep. de X." The first mapping rule states that the left and right metanouns, labeled −1 and +1 respectively, are swapped, and the second mapping rule states that the Chinese word "de" is appended to the metaverb. Another mapping rule from English to Chinese is deletion of definite articles (GF Code P1), since Chinese lacks definite articles. Finally, since the transitive verb (GF Code H2) comes in the same place in Chinese as in English, the mapping rule specifies a null transformation.

TABLE 3

SAMPLE MAPPING RULES 234

| Source | Target | GF Code | Action | Word | Set A | Set B |
|---|---|---|---|---|---|---|
| English | Chinese | M0 | Swap | * | −1 | +1 |
| English | Chinese | M0 | Add | de | 0 | 0 |
| English | Chinese | P1 | Delete | * | −1 | −1 |
| English | Chinese | H1 | Move | * | 0 | 0 |

Referring to TABLE 3, the Source and Target fields indicate the source language and the target language respectively. The GF Code indicates the grammatical form of the record set, which can be a metaverb or a metanoun. The Action field specifies the action to take: "Combine" for combining two word forms into one, "Delete" for deleting a word from a record set, "Move" for moving a word form from one record set to another, "Separate" for separating a word form into two or more word forms, "Add" for adding a word form to a record set, and "Swap" for swapping the positions of two record sets. The Set A and the Set B arguments are used in conjunction with the Action field as appropriate and specify the particular result set used by the Action field: −1 for left the metanoun, 0 for the metaverb, and +1 for the right metanoun. The mapping rules 234 thus provide a powerful mechanism for handling and translating grammatical constructs.

The split rules 232 specify how to decompose a grammatical tagged word stream into a "split tree." A split tree is hierarchical arrangement of triplets, wherein each triplet partitions one or more word forms into three data sets. The three data sets correspond to the left metanoun, the metaverb, and the right metanoun, respectively, of an epistemic instance. Since the arrangement is hierarchical, the word forms of the metanoun may be partitioned yet again into two metanouns and a metaverb. Thus, a lower-level triplet partitions the word forms embedded in a data set of a higher-level triplet, and the top-level triplet partitions the words of the source signal. One implementation of a split tree, using relational database constructs is described in more detail hereinafter.

TABLE 4

SAMPLE SPLIT RULES 232

| Language | Sequence | Package Name | Split Type |
|---|---|---|---|
| English | 1100 | SENT_SVO | 4 |
| English | 1235 | PREP_POM_NP | 1 |

TABLE 4 illustrates some exemplary split rules 232. The Language field indicates for which language the split rule is appropriate. The Sequence field provides an ordering of the split rules, generally from the character and word composition level, to the formatting level, to the paragraph level, to the sentence level, to the clause level, and down to the phrase and word level. The Package Name identifies an arrangement of instructions that are configured to identify whether a particular split is appropriate and flags which word forms as belonging to the metaverb (record set 0) of the split. In the example, SENT_SVO is a package for identifying and splitting subject-verb-object sentences and PREP_POM_NP for identifying and splitting prepositional phrases that are postmodifiers to noun phrases.

The Split Type field specifies how to perform the split, generally by identifying which word forms that are to be put in the metaverb record set. For example, split type 1 indicates to put only the selected word form in the metaverb record set, split type 3 is for null-metaverb, and split type 4 is for metaverb having more than one word forms, such as a verb and the adverbs that modify it. The remaining word forms, generally to the right and left of the metaverb, are put into the −1 and +1 record sets, respectively, although a special purpose split type may be devised to handle a particularly exotic source language construct. When a record set is split, record set 0, corresponding to the metaverb, is tagged with a node label indicating the type of split, e.g. SENT_SVO.

For decomposing English language text, the following split rules have been found to be useful:

simple sentence types including subject-verb, subject-verb-object, subject-verb-indirect object-direct object, subject-verb-direct object-indirect object, subject-verb-predicate, and subject-verb-object-predicate;

rearrangements of simple sentence types including cleft, extraposed "it . . . that" subjects, existential "there" or "have", left dislocation, right dislocation, subject-verb inversion, and exchanged object and predicate;

complex sentence types including coordination; subordination linked as main-subordinate for subject clauses, complement clauses, phrase constituents, variably connected clauses, subordination linked to two or more main clauses, and appositive clauses; varied coordination and subordination; and subordinate clause structures such as nominal clause, relative clauses, adverbial clauses, and comparative clauses; and clause clusters or punctuation;

interrogative sentence types including yes/no questions, positive orientation, negative orientation, tag questions, declarative questions, yes/no questions with modal auxiliaries, wh-questions, alternative questions, exclamatory questions, and rhetorical questions;

other sentence types including ellipted, general punctuated, formula sentences, aphoristic sentences, block language sentences, unfinished sentences, and non-clauses;

noun phrase [DET+PRM+HN+POM] types including subject, direct object, indirect object, subject predicative, object predicative, complement of a preposition, premodifier of a noun or noun phrase, vocative, adverbial, premodifier of an adjective, premodifier of a preposition, premodifier of an adverb, postmodifier of a noun, and postmodifier of an adjective;

verb phrase [AUX+V] types including primary auxiliary, and modal auxiliary;

adjective phrase [PRM+ADJ+POM] types including premodifier of a noun, subject predicative, object predicative, postmodifier of a pronoun, postmodifier of a noun, nominal adjective, complement of a preposition;

adverb phrase [PRM+ADV+POM] types including premodifier of an adjective, and premodifier of an adverb, adverbial, subject predicative, premodifier of a preposition, premodifier of a pronoun, premodifier of a determiner, premodifier of a numeral, premodifier of a noun phrase, postmodifier of a noun phrase, postmodifier of an adjective or adverb, subject predicative, object predicative, and complement of a preposition; and prepositional phrase [PFN+PREP+PRCMP] types including noun phrase as complement, -ing participle clause as complement, wh-clause as complement, adverb as complement, adjective as complement, postmodifier of a noun, postmodifier of an adjective, subject predicative, object predicative, adverbial, and complement of a verb).

One way to facilitate the entry of special word forms and sub-grammatical forms is to establish a word construction table (not shown), which allows for groups of word forms to be specified. The word construction table can also include positional information to help linguists in one embodiment to write the appropriate split rules 232, mapping rules 234, and entries in the universal dictionary 236 for these special groups of words. This positional information may include: any allowable word position, same as the English position, immediately after the keyword, immediately before the keyword, any where after the key word, separated by a word or grammatical form, in combination, at the end of the sentence, and at the beginning of the sentence. In another embodiment, some of the split rules 232, mapping rules 234, and entries in the universal dictionary 236 can be automatically generated from the word construction. Thus, special word formations, which map multiple word constructions in one language to a single unit in another language, such as idioms, can be handled.

TABLE 5 illustrates a portion of an exemplary word construction, set up for the verb phrase "have been running," where position code {A} means any allowable position, position code {B} means before the keyword and separated by an adverb.

The output of preprocessing in step 300 is a sequence of word forms of the input speech text that are embodied in the source signal. This sequence of word forms constitutes a "record set". For example, a person may utter the sentence "I have read the book under the table" into a microphone. This acoustic signal, the person's utterance, is converted by a microphone into analog electric signals. Since the preprocessor module 210 is typically implemented on a digital computer system, the analog electric signals are converted by an analog-to-digital converter to produce a digital signal embodiment of the person's utterances. After preprocessing in step 300, a result set 400, illustrated in FIG. 4(*a*), is produced. In one implementation, specifically with a relational data base, the record set 400 comprises eight rows of a table, one row for each word embodied in the source signal.

WORD STREAM ANALYSIS

Figure 3A:
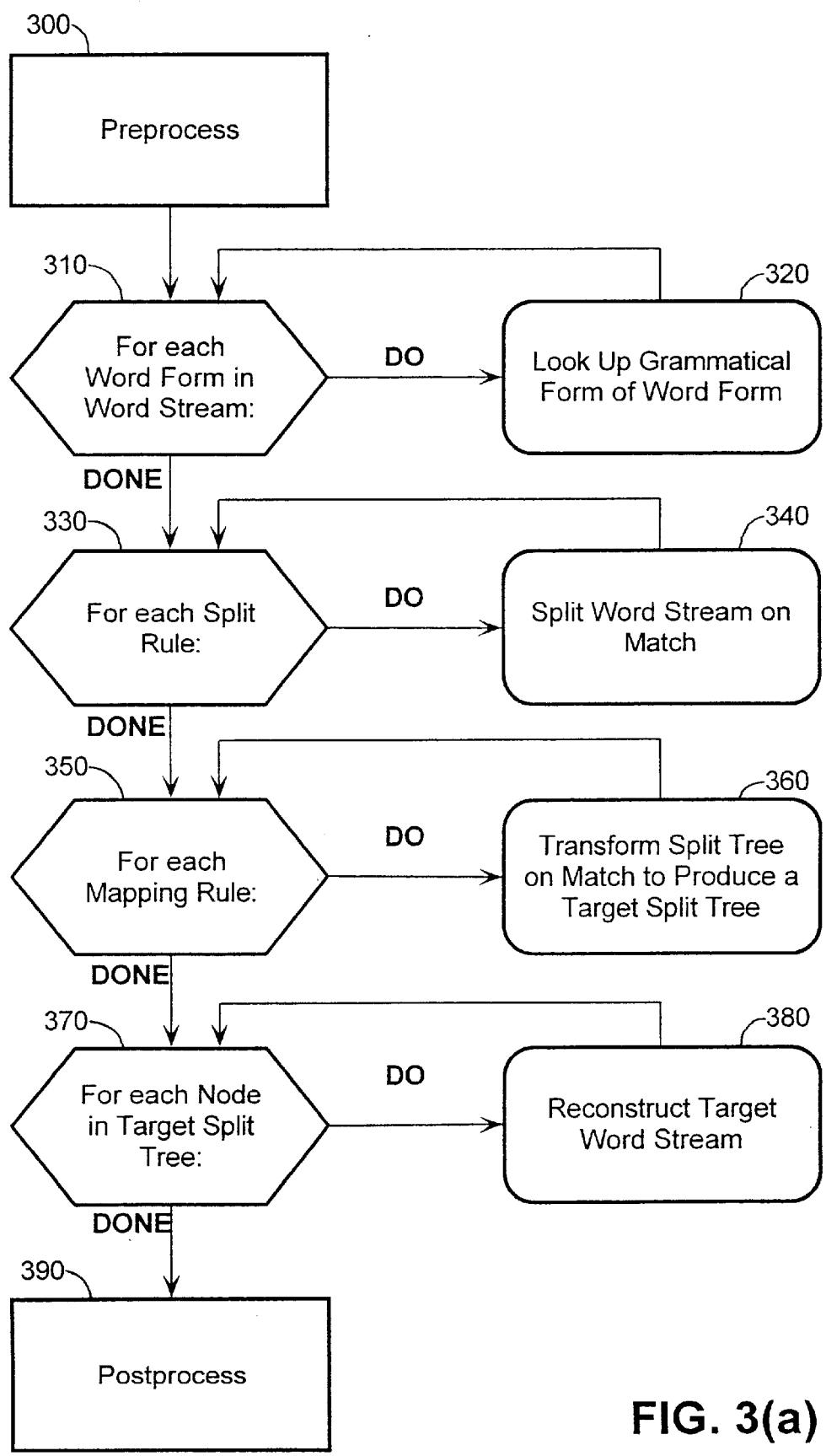
FIG. 3(a) is a flowchart showing the operation of a universal language translation system.
Figure 3B:
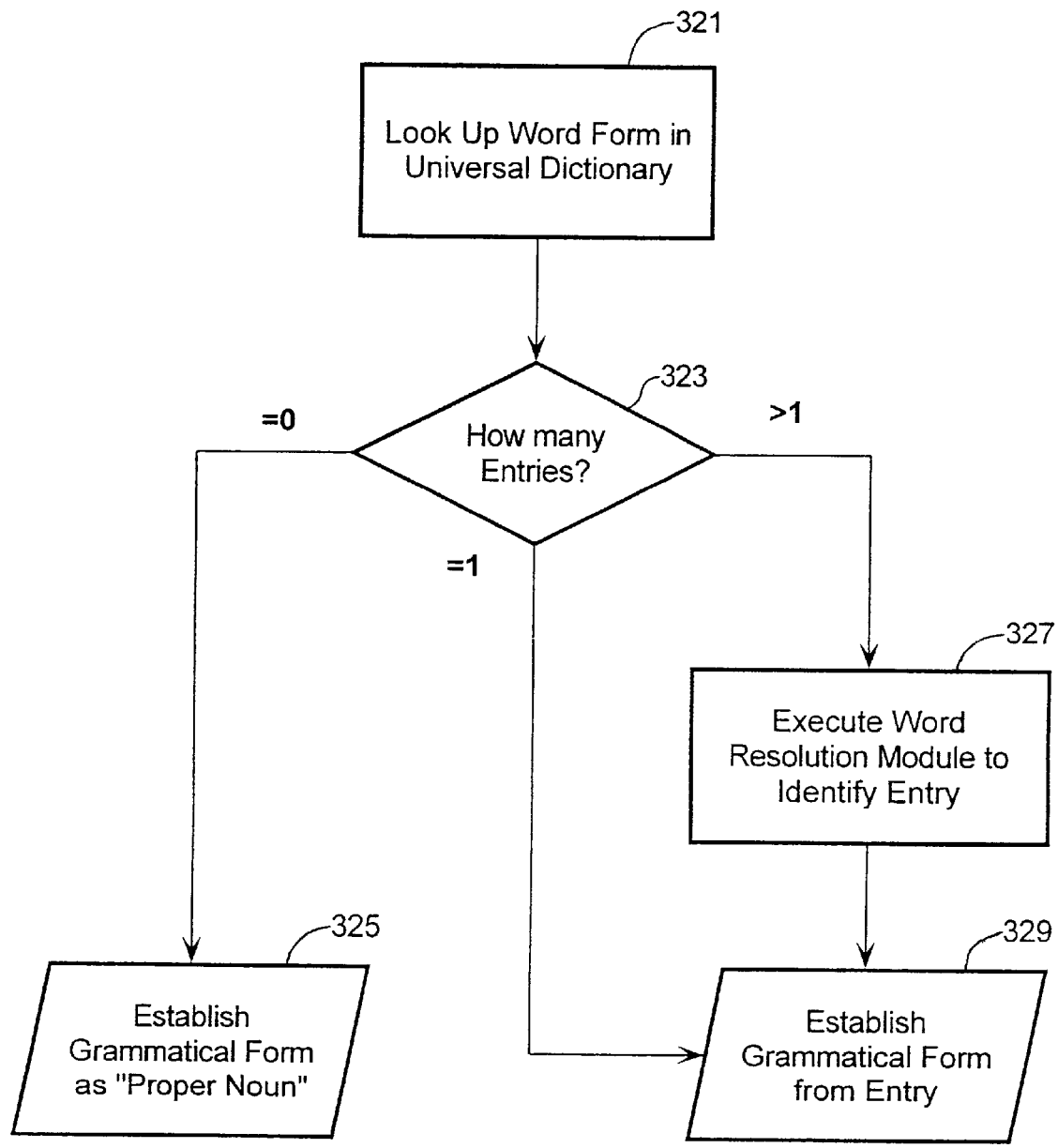
FIG. 3(b) is a flowchart showing the operation of determining a grammatical form for a word.

Referring back to FIG. 3(*a*), each word in the record set 400 is successively visited (step 310) by the word stream analyzer 202. More specifically, a grammatical form code is determined for each word in the record set 400 in step 320. FIG. 3(*b*) illustrates one technique for determining the grammatical word code. First, the word form under consideration is looked up in the universal dictionary 236 (step 321). The number of entries returned from the universal dictionary 236 lookup determines how the execution will branch (step 323). If there are no entries in the universal dictionary 236 for the word form, then the grammatical form

TABLE 5

SAMPLE OF A WORD CONSTRUCTION TABLE

| Keyword | Pos0 | Construction | Aux1 | Pos1 | Aux2 | Pos2 | ... | AuxN | PosN |
|---------|------|--------------|------|------|------|------|-----|------|------|
| running | {A}  | have been running | have | {B} | been | {B} | ... | —    | —    |

OPERATIONAL EXAMPLE

Referring to FIG. 3(*a*), depicted is a flowchart illustrating steps performed in the operation of an embodiment of a universal translation system. Step 300 is a preprocessing step that receives a source signal as input in one form, such as a digital signal representing text in a source language, an acoustic signal representing speech in a source language, and an optical signal representing characters in the source language. This preprocessing step 300 may be performed by standard speech recognition or optical character recognition implementations.

In one embodiment, however, the preprocessing functionality is handled by another instantiation of the translation engine, wherein the ancillary data structures are appropriately populated. For example, to perform speech recognition as preprocessing steps, the acoustic wave forms or "phones" are stored in the universal dictionary, split rules are devised to recognize phrase, word, and segment boundaries among the phones, and mapping rules are formulated to translate the phones into textual words, for example into ASCII and Unicode. In fact, since the phonemicization of aural speech sounds into recognizable phonemes and then into words is fundamentally a grammatical process, another embodiment of the universal translation system, operating according to the principles of a universal grammar, is an ideal choice for speech recognition. Thus, even the preprocessing and post-processing stages can be implemented by embodiments of the universal translation system.

is established for the word form as a proper noun (step 325). In the working example of "I have read the book under the table," no word form is a proper noun.

If, on the other hand, there is exactly one entry in the universal dictionary 236, then execution branches to step 329 where the grammatical form within the entry of the universal dictionary 236 for the word form is established. In the working example, the pronoun "I" has exactly one entry (see TABLE 1) and therefore the grammatical form of S1 for personal pronoun is established for the source word form "I." Please note that this example is for purposes of illustration and will probably not reflect the state of an actual universal dictionary 236. For example, useful embodiments of universal dictionary 236 will include a noun entry for every word to handle self-referential words, such as the word "I" in the sentence, "The word 'I' is a pronoun." Furthermore, if the universal dictionary includes Japanese, then there would a plurality of entries for the personal pronoun "I."

Alternatively, there may be a plurality of entries in the universal dictionary for the word form. This state of affairs is due to the word form's being either grammatically or semantically ambiguous or both. In the example with TABLE 1, an ambiguity is inherent in any source word stream that includes the word "read", because the verb "read" might be transitive ("to read a book") or intransitive ("to read, be literate"), necessitating the translation of different Chinese words, yuèlǎn and dúshū respectively. To resolve this ambiguity, a word resolution module, which is an arrangement of instructions such as a subroutine or and ID package, is executed (step 327) to decide which among the various entries for the word "read" is best.

When executed, the ID package can perform any effectual technique for choosing one of the meanings of the facially ambiguous word form, including inspecting other words in the same context, use of statistical techniques, and even spawning an invocation of the word stream analyzer 202 and the mapping unit 204. If the ID package is unable to disambiguate the word form, then one of the entries will be picked as a default. In the exemplary sentence, the transitive meaning corresponding to the Chinese word yuèlǎn, detectable on account of the direct object noun phrase "the book under the table", would be selected. Accordingly, the grammatical form HI for transitive verb would be established for the word form (step 329).

DECOMPOSITION

Referring again to FIG. 3(a), step 330 is the next stage performed by the word stream analyzer 202. More specifically, step 330 iterates over the sequence of split rules 232. For each of the split rules 232, the record set is split according to the split rule if the split rule matches the word forms and grammatical forms in the record set (step 340). In the example, split rule 1100 of TABLE 4 matches against record set 400, because record set 400 is a simple sentence in subject-verb-object order. Accordingly, split rule 110 causes record set 400 to be partitioned, that is, disjointedly subdivided, into three data sets: record set 410 containing the pronoun "I" and corresponding to a metanoun as subject in this epistemic instance, record set 412 with the word forms "have" and "read" as the metaverb, and the direct object "the book on the table" in a record set 414 as the right metanoun. If adverbs were present, they would go in the metaverb record set 412.

Figure 4A:
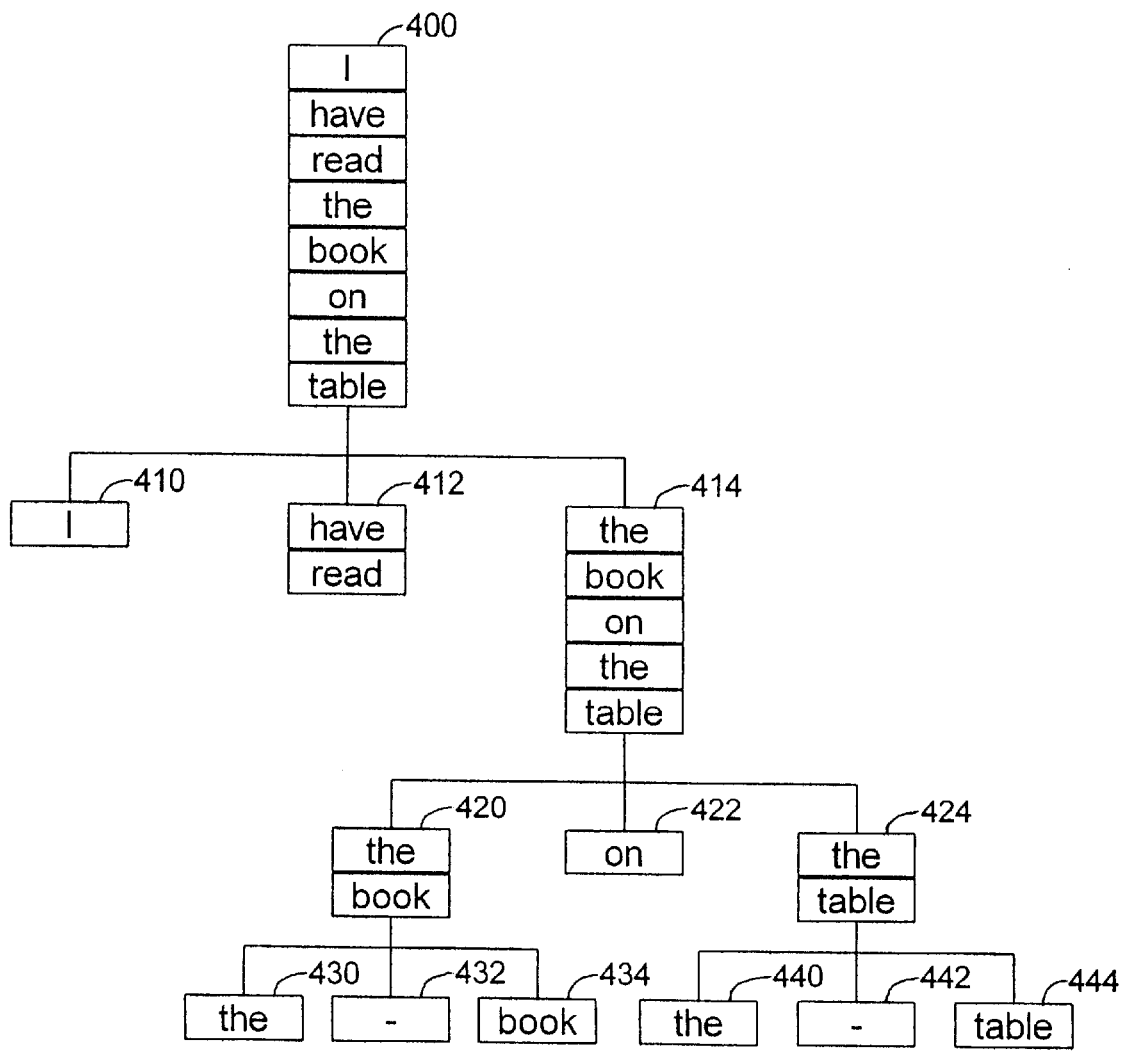
FIG. 4(a) depicts an initial split tree before mapping.

After this split has occurred, the process is repeated by looping back to step 330. On a later iteration, split rule 1235 of TABLE 4 will eventually match record set 414 and cause the record set 414 to be decomposed into three data sets. The −1 record set is record set 420 and contains "the book" as the left metanoun. The metaverb is handled in the 0 record set 422 and includes the preposition "on," and the right metanoun in the +1 record set 424 containing "the table." As also illustrated in FIG. 4(a), record set 420 and record set 424 are further decomposed into triplet 430, 432, and 424 and triplet 440, 442, and 444, respectively. What is interesting about the metaverbs 432 and 442 is that they can be blank to express, for example, a definite article transforming with a noun. While the sample translation does not show the splitting of a metaverb, a metaverb too may be further decomposed, for example, if it contains an adverbial prepositional phrase.

In accordance with one embodiment, the split tree of record set 400 is implemented in a table on a relational database system. More specifically, each record set is identified by its own key in the initial data set, a level of decomposition, the particular split set (−1, 0, or +1), and the key of the word form to the universal dictionary 236. For example, TABLE 6 illustrates any exemplary split table corresponding to the split table of FIG. 4(a), as implemented by a relational database table, with the actual source word form substituted for the universal dictionary 236 key for clarity.

TABLE 6

SAMPLE SPLIT TABLE 400

| Language | Key | Level | Set | Word |
|---|---|---|---|---|
| English | 1 | 0 | 0 | I |
| English | 2 | 0 | 0 | have |
| English | 3 | 0 | 0 | read |
| English | 4 | 0 | 0 | the |
| English | 5 | 0 | 0 | book |
| English | 6 | 0 | 0 | under |
| English | 7 | 0 | 0 | the |
| English | 8 | 0 | 0 | table |
| English | 1 | 1 | −1 | I |
| English | 2 | 1 | 0 | have |
| English | 3 | 1 | 0 | read |
| English | 4 | 1 | +1 | the |
| English | 5 | 1 | +1 | book |
| English | 6 | 1 | +1 | under |
| English | 7 | 1 | +1 | the |
| English | 8 | 1 | +1 | table |
| English | 4 | 2 | −1 | the |
| English | 5 | 2 | −1 | book |
| English | 6 | 2 | 0 | under |
| English | 7 | 2 | +1 | the |
| English | 8 | 2 | +1 | table |
| English | 4 | 3 | −1 | the |
| English | 0 | 3 | 0 | — |
| English | 5 | 3 | +1 | book |
| English | 7 | 3 | −1 | the |
| English | 0 | 3 | 0 | — |
| English | 8 | 3 | +1 | table |

For purpose of clarity, FIG. 4(a) and TABLE 6 illustrate a split table holding an actual source language word form, such as "I", in each record. However, in a preferred embodiment, the word form is replaced within the split tree by the appropriate key to the universal dictionary 234 entry, facilitating a direct access to the target language word form. FIG. 4(b) depicts a more compact schematic of the same split tree, but with elimination of visually redundant elements.

MAPPING

Referring again to FIG. 3(a), the next step, which is performed by mapping unit 204, is to apply the mapping rules (step 350). More specifically, step 350 iterates over the sequence of mapping rules 234. For each of the mapping rules 234, the record set is mapped according to the mapping rule if the mapping rule matches with any of the node labels, word forms, and grammatical forms in the record set (step 360). Referring to FIG. 4(b) of the example, applying the mapping rule that deletes definite articles, as in TABLE 3, causes two triplets to be transformed. In the transformation, record sets may be swapped, and words forms may be added, deleted, changed, and moved around within and between record sets. Furthermore, the grammatical forms of the source language is also transformed into the appropriate target language grammatical form as indicated by the mapping rule. Mapping rules can be sequentially sequence similarly to the sequencing of the split rules so that they may execute in a predetermined order. Sequencing mapping rules help to alleviate the implementation of the universal translation system, for example, by placing swaps last.

Figure 4C:
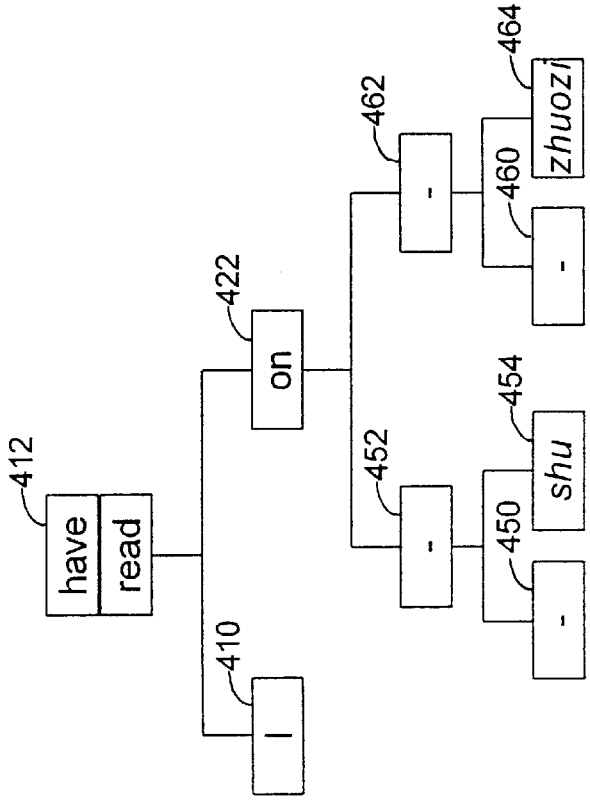
FIG. 4(c) depicts the split tree at another point during mapping.
Figure 4B:
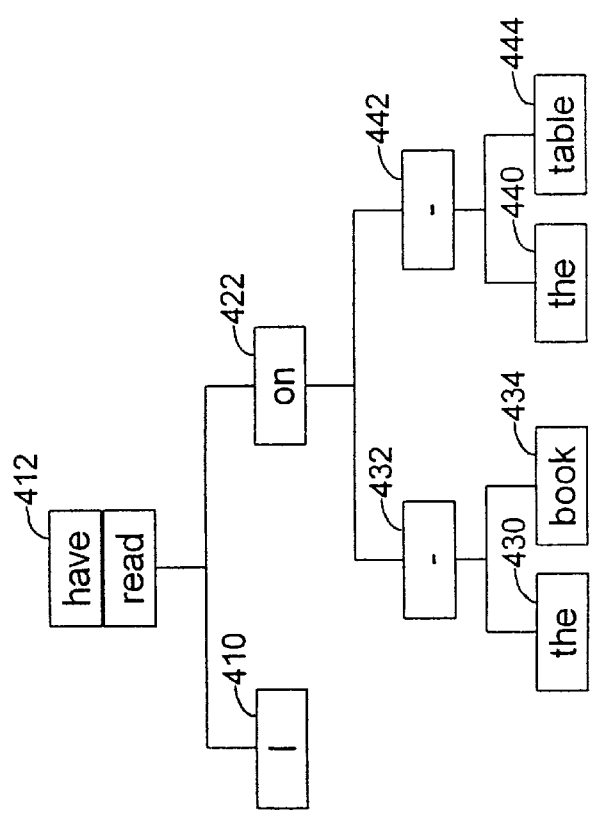
FIG. 4(b) depicts the split tree during mapping.
Figure 4E:
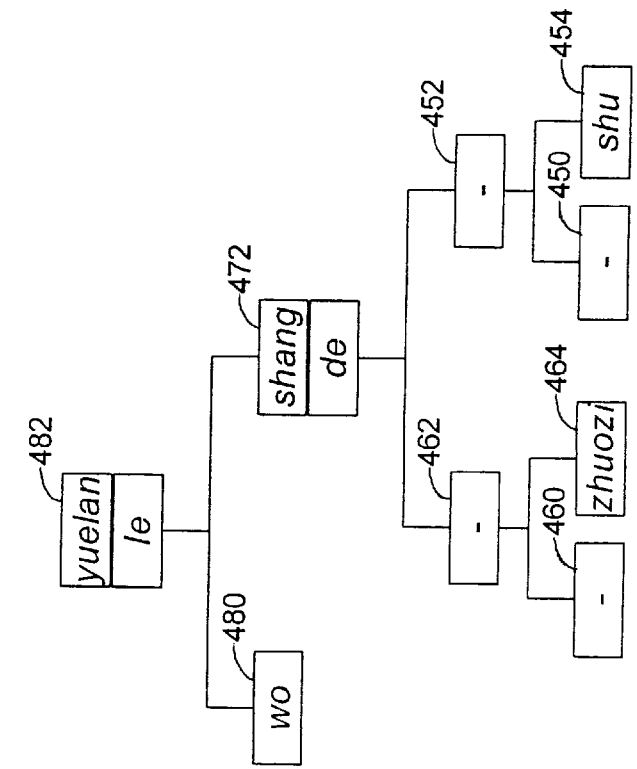
FIG. 4(e) depicts the split tree at yet another point during mapping.
Figure 4D:
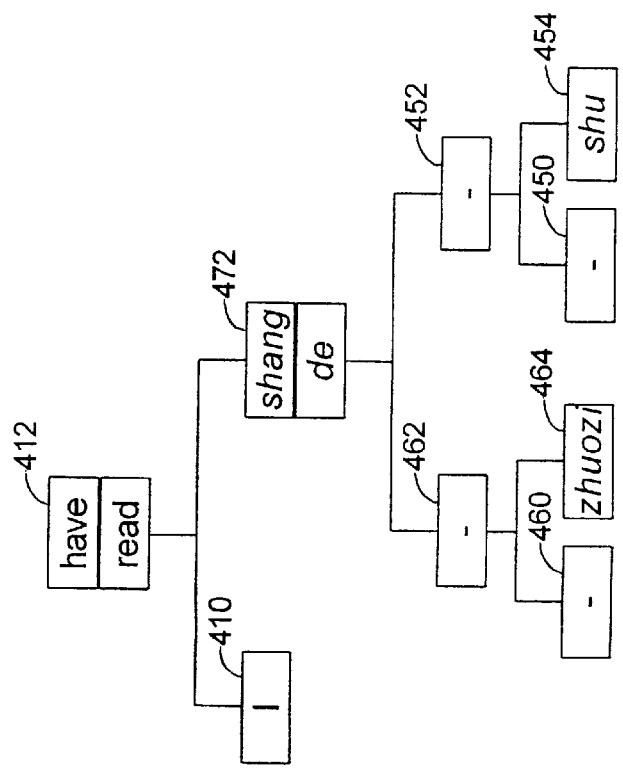
FIG. 4(d) depicts the split tree at still another point during mapping.
Figure 4F:
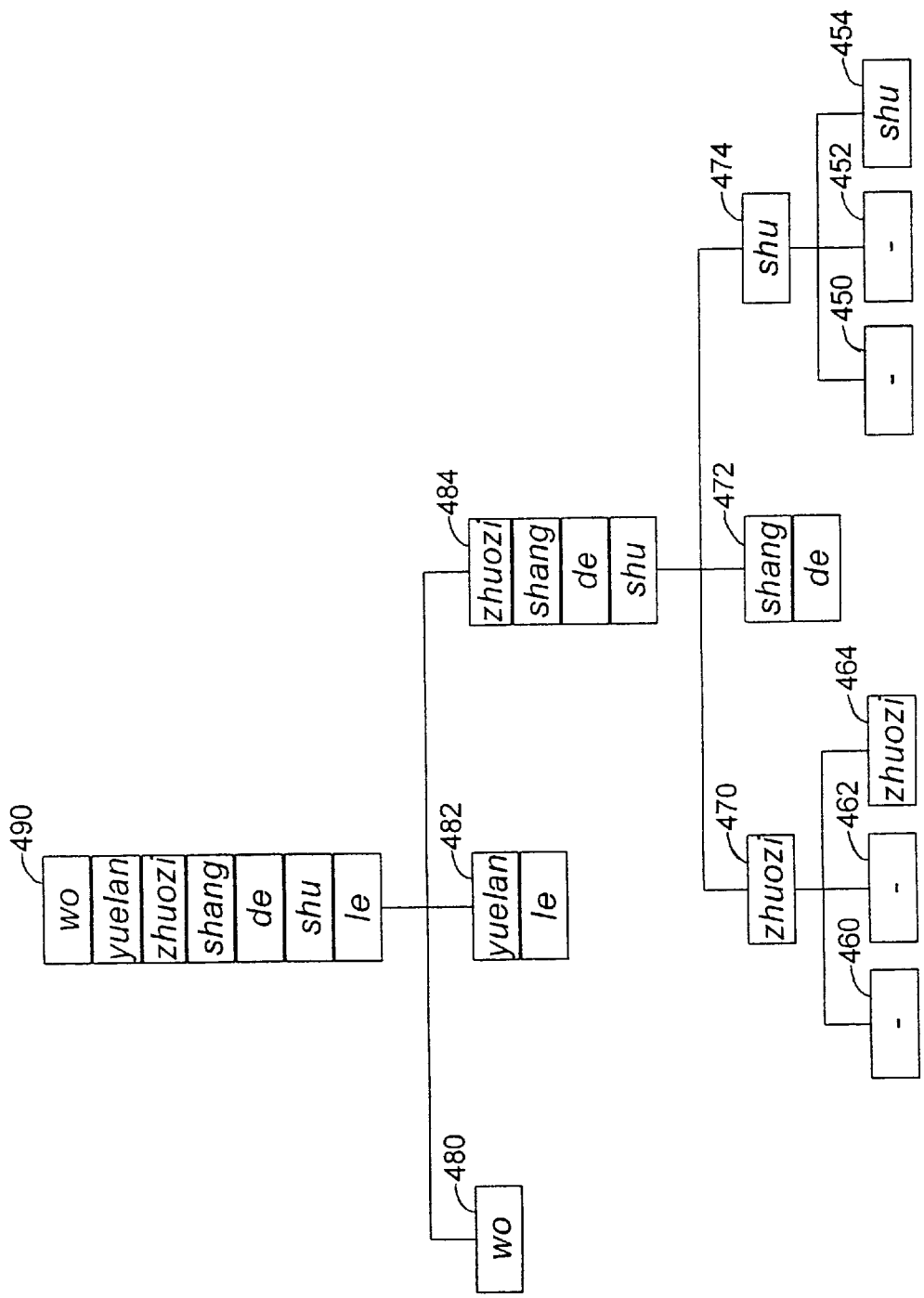
FIG. 4(f) depicts the split tree after mapping.

First, the triplet whose metaverb is in record set 430, 432, and 434 is transformed to produce record sets 450, 452, and 454 as shown in FIG. 4(c). In this transformation, the definite article is deleted from record set 430 as shown in record set 450.

Furthermore, for purposes of illustration, the word from of transformed record set 454 is shown in its Chinese form, that is shū, to indicate this record set has been mapped by a mapping rule, although the preferred form is a key into the appropriate universal dictionary entry. Similarly, record sets 440, 442, and 444 is mapped to record sets 460, 462, and 464, wherein the definite article is deleted in record set 460 and the word form in record set 464 is shown herein for illustrative purposes as the Chinese word form zhuōzi.

The next mapping rule that occurs in this example is transforming the prepositional phrase at metaverb record set 422 according to dictates of Chinese grammar. With reference to FIG. 4(*d*), this mapping rule causes record sets 452 and 462 to be swapped and the Chinese particle de to be added after the preposition shàng (for "on"). In the relational database implementation, since the key values serve to order the word forms in the word stream, new keys values should be assigned to reflect that the former right-hand side (record set −1) now follows the former left-hand side (record set +1). In one such implementation, an extra column for the new key is added to the split table.

The next mapping rule, whose result is shown in FIG. 4(*e*), handles transitive verbs. Although this mapping is largely a null transformation, the past tense sub-grammatical form is converted from "have read" to the Chinese "yuèlǎn ... le" in record set 482. Furthermore, record set 480, corresponding to the "I" of the original record set 410, is displayed for purpose of illustration with the Chinese word form "wǒ."

TARGET WORD STREAM RECONSTRUCTION

After all the mapping rules 234 have been applied in steps 350 and 360 of FIG. 3(*a*), the target word stream is reconstructed by the word stream construction module 206 from the transformed split tree. With continued reference to FIG. 3(*a*), the nodes of the split tree, that is the record sets, are successively visited in step 370, preferably in a bottom-to-top, left-to-right order. At step 380, each metaverb record set 0 is converted into a record set that also includes the metanoun record sets −1 and +1.

Generally, while constructing, the target word forms will be arranged in a left-to-right order, but other orderings may be effectuated as appropriate and as recorded in the word construction table. Although FIGS. 4(*a*)–(*f*) illustrate the split tree with a source or target language word form instead of a key into the universal dictionary 236, it is during this step that the universal dictionary 236 key is finally resolved into the target word form by a look up operation.

For the working example, the reconstruction of the target word stream is illustrated in FIG. 4(*f*). Traversing bottom-to-top and left-to-right, record sets 450, 452, and 454 are first visited. In the relational database implementation, these records can be chosen by selecting the records with the highest level number and the highest new key values. The combination record sets 450, 452, and 454, which is trivial, is reflect in record set 474 as "shū". Similarly, the other level 3 record sets, namely record sets 460, 462, and 464, are reconstructed into record set 470 as "zhuōzi".

At the next higher level, record sets 470, 472, and 474 are coalesced in the normal left-to-right order as "zhuōzi shàng de shū" in record set 484. This record set 484 is the Chinese target text that corresponds to the English source text of "the book under the table." At a still higher level, record set 480 with "wǒ", record set 482 with "yuèlǎn ... le", and record set 484 with "zhuōzi shàng de shū" are combined together. Therefore, the reconstructed final order shown in result set 490 is "wǒ yuèlǎn zhuōzi shàng de shū le," because the particle le belongs at the end of the clause, as the Chinese translation of the English clause "I have read the book under the table." Special word place rules may be handled by the mapping rules in one embodiment or by special reconstruction rules in an alternative embodiment.

Referring back to FIG. 3(*a*) the target word stream undergoes a post-processing step 390 by post-processor 220. Post-processor 220 performs analogous sensory medium conversions, similar but opposite of the conversions performed by pre-processor 210. For example, the result of post-processing in step 390 may be a digital signal representing text in the target language, an acoustic signal representing speech in the target language (as by a speech synthesizer), and an optical signal representing characters in the target language, for example, as displayed on a cathode-ray tube or printed out on a piece of paper.

EXTENSIONS AND APPLICATIONS

It is evident that the universal language translation model described herein is a very powerful mechanism for manipulating information in any form. Therefore, the present invention is not limited merely to translating from one human language to another. In fact, the principles discussed herein are applicable to transforming any source signal that embodies information. Information may be defined as a knowledge representation relating to any knowledge discipline that is ultimately useful to any sentient or conscious creature such as human being.

For example, information represented according to formatting conventions and languages such as HyperText Markup Language (HTML) can be usefully transformed. Other examples of knowledge disciplines include engineered ssytems such as such as AID converters and satellite systems, mathematical theories and expressions such as $y=f(x)$ and $F=ma$, and biological orders such as DNA replication. In addition, embodiments are applicable to controlling dynamic systems such as factories, power plants, and financial institutions.

As another example, artificial languages such as computer source programming languages are fairly straightforward to translate, because programming languages are much less ambiguous than natural languages. Thus, by analyzing source code into a triplet internal representation or into an internal representation of epistemic instances, computer source can be translated into object code like a conventional compiler, into the source code of another high-level language such a FORTRAN to C++.

Similarly, object code, that is machine-executable instructions, embody information in the operations the computer will carry out. Thus, by properly setting up the universal dictionary 246, the mapping rules 234, and the split rules 232, object code can be transformed into knowledge embodiments according to other knowledge representations, for example, source code, object code for another processor, and even a natural, human language. In fact, since programmable digital logic devices such as gate arrays are described by a hardware description language, object code can be translated into the hardware description language, and then directly manufactured. Since some implementations are capable of translating natural and artificial languages into a object code and since object code can be translated into hardware, a mechanism is provided for building Application Specific Integrated Circuits (ASICs) from a functional source code program, an executable file, even a precise English language description, for example, "Make me an operational amplifier having a gain of . . . ".

In another application, a universal machine translator can be integrated into telecommunications devices to produce a "universal communicator." For example, either or both of the pre-processing unit 210 and post-processing unit 220 can be coupled into a wireless or wireline telephone system and network, a multimedia communications system, a modem, a facsimile machine or telecopier, a computer system and/or network, a pager, a radio and/or television system, a radar, sonar, infrared, and optical communications system, a photocopy machine, a hand-held, lap-top, or body-worn communications device, or another other machine communications device for machine and operation in any knowledge discipline.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of translating a source signal embodying information according to a source language into a target signal embodying information according to a target language, said method comprising the steps of:

storing a plurality of related dictionary entries in a computer-readable medium, each of the related dictionary entries including a source word form according to the source language, a source grammatical form for the source word form, a corresponding target word form according to the target language, and a target grammatical form for the target word form;

analyzing the source signal to produce a first internal representation of the information embodied in the source signal based on the related dictionary entries, the first internal representation consisting of epistemic instances;

transforming the first internal representation to produce a second internal representation according to the target language the second internal representation consisting of epistemic instances; and constructing the target signal based on the second internal representation and the related dictionary entries;

wherein each of the epistemic instances comprises a triplet consisting of a pair of objects of transformation and a transformer of the pair of objects the objects and the transformer being word forms of the source or the target language.

2. The method of claim 1, wherein the step of analyzing includes the steps of:

selecting a plurality of word forms embedded in the source signal;

determining respective grammatical forms for the selected word forms based on the dictionary; and decomposing the source signal into the first internal representation based on at least some of the word forms and the respective grammatical forms.

3. The method of claim 2, wherein the step of analyzing includes the step of identifying special word formations.

4. The method of claim 2, wherein the step of determining respective grammatical forms for the word forms includes the steps of:

accessing the dictionary to identify one or more entries in the dictionary corresponding to a selected word form from among the word forms embedded in the source signal;

establishing whether there is a plurality of entries in the dictionary corresponding to the selected word from;

if there is a plurality of entries in the dictionary corresponding to the selected word form, then executing an arrangement of instructions, associated with the selected word form, to select the source grammatical form in one of the plurality of entries based on other word forms embedded in the source signal; and if there is a single entry in the dictionary corresponding to the selected word form, then selecting the source grammatical form in the single entry.

5. The method of claim 2, wherein the step of determining respective grammatical forms for the word forms includes the steps of determining a part of speech and a sub-grammatical form.

6. The method of claim 2, further comprising the step of storing a sequence of decomposition rules in a computer-readable medium, each of the decomposition rules describing a condition under which the decomposition rule applies and how to partition a plurality of words forms in the source language into three data sets forming a triplet, under the condition the decomposition rule applies.

7. The method of claim 6, wherein the step of decomposing the source signal into the first internal representation based on at least some of the word forms and the respective grammatical forms includes the step of:

evaluating whether the condition under which one of the decomposition rules applies to a plurality of the word forms based on at least some of the word forms and the respective grammatical forms; and if the condition under which one of the decomposition rules applies, then partitioning the plurality of the word forms into three data sets to form a triplet in accordance with said one of the decomposition rules.

8. The method of claim 6, wherein:

the first internal representation comprises a first hierarchical arrangement of triplets, including:

a top-level triplet partitioning word forms embedded in the source signal into three data sets thereof, and a lower-level triplet partitioning word forms embedded in a data set of a higher-level triplet into three data sets thereof; and the step of transforming the first internal representation to produce a second internal representation according to the target language includes the step of mapping at least some of the triplets in the first hierarchical arrangement to produce a second hierarchical arrangement of triplets according to the target language.

9. The method of claim 8, further comprising the step of storing a sequence of mapping rules in a computer-readable medium, each of the mapping rules describing a triplet according to the source language and a corresponding triplet according to the target language.

10. The method of claim 9, wherein the step of mapping at least some of the triplets in the first hierarchical arrangement to produce a second hierarchical arrangement of triplets according to the target language includes the step of mapping the at least some of the triplets in the first hierarchical arrangement to produce a second hierarchical arrangement of triplets based on the mapping rules.

11. The method of claim 10, wherein the step of mapping at least some of the triplets in the first hierarchical arrangement to produce a second hierarchical arrangement of triplets according to the target language includes the steps of:

accessing the sequence of mapping rules to find a source triplet in the first hierarchical arrangement of triplets that matches the triplet according to the source language of an accessed mapping rule;

generating a target triplet based on the corresponding triplet according to target language; and producing the second hierarchical arrangement based on the target triplet.

12. The method of claim 8, wherein:

the triplets include references to at least some of the dictionary entries; and the step of constructing the target signal based on the second internal representation and the dictionary entries includes the steps of:

traversing the second hierarchical arrangement of triplets;

while traversing the second hierarchical, accessing the dictionary to identify target word forms based on the references to at least some of the dictionary entries.

13. A computer-readable medium bearing instructions for translating a source signal embodying information according to a source language into a target signal embodying information according to a target language, said instructions arranged, when executed, to cause one or more processors to perform the steps of:

storing a plurality of related dictionary entries in a second computer-readable medium, each of the related dictionary entries including a source word form according to the source language, a source grammatical form for the source word form, a corresponding target word form according to the target language, and a target grammatical form for the target word form;

analyzing the source signal to produce a first internal representation of the information embodied in the source signal based on the related dictionary entries, the first internal representation consisting of emistemic instances;

transforming the first internal representation to produce a second internal representation according to the target language the second internal representation consisting of epistemic instances; and constructing the target signal based on the second internal representation and the related dictionary entries;

wherein each of the epistemic instances comprises a triplet consisting of a pair of objects of transformation and a transformer of the pair of objects the objects and the transformer being word forms of the source or the target language.

14. The computer-readable medium of claim 13, wherein the step of analyzing includes the steps of:

selecting a plurality of word forms embedded in the source signal;

determining respective grammatical forms for the selected word forms based on the dictionary; and decomposing the source signal into the first internal representation based on at least some of the word forms and the respective grammatical forms.

15. The computer-readable medium of claim 14, wherein the step of determining respective grammatical forms for the word forms includes the steps of:

accessing the dictionary to identify one or more entries in the dictionary corresponding to a selected word form from among the word forms embedded in the source signal;

establishing whether there is a plurality of entries in the dictionary corresponding to the selected word from;

if there is a plurality of entries in the dictionary corresponding to the selected word form, then executing an arrangement of instructions, associated with the selected word form, to select the source grammatical form in one of the plurality of entries based on other word forms embedded in the source signal; and if there is a single entry in the dictionary corresponding to the selected word form, then selecting the source grammatical form in the single entry.

16. The computer-readable medium of claim 14, wherein the step of determining respective grammatical forms for the word forms includes the steps of determining a part of speech and a sub-grammatical form.

17. The computer-readable medium of claim 14, wherein said instructions are further arranged to cause the one or more processors to perform the step of storing a sequence of decomposition rules in a third computer-readable medium, each of the decomposition rules describing a condition under which the decomposition rule applies and how to partition a plurality of words forms in the source language into three data sets forming a triplet, under the condition the decomposition rule applies.

18. The computer-readable medium of claim 17, wherein the step of decomposing the source signal into the first internal representation based on at least some of the word forms and the respective grammatical forms includes the step of:

evaluating whether the condition under which one of the decomposition rules applies to a plurality of the word forms based on at least some of the word forms and the respective grammatical forms; and if the condition under which one of the decomposition rules applies, then partitioning the plurality of the word forms into three data sets to form a triplet in accordance with said one of the decomposition rules.

19. The computer-readable medium of claim 17, wherein:

the first internal representation comprises a first hierarchical arrangement of triplets, including:

a top-level triplet partitioning word forms embedded in the source signal into three data sets thereof, and a lower-level triplet partitioning word forms embedded in a data set of a higher-level triplet into three data sets thereof; and the step of includes transforming the first internal representation to produce a second internal representation according to the target language the step of mapping at least some of the triplets in the first hierarchical arrangement to produce a second hierarchical arrangement of triplets according to the target language.

20. The computer-readable medium of claim 19, wherein said instructions are further arranged to cause the one or more processors to perform the step of storing a sequence of mapping rules in a computer-readable medium, each of the mapping rules describing a triplet according to the source language and a corresponding triplet according to the target language.

21. The computer-readable medium of claim 20, wherein the step of mapping at least some of the triplets in the first hierarchical arrangement to produce a second hierarchical arrangement of triplets according to the target language includes the step of mapping the at least some of the triplets in the first hierarchical arrangement to produce a second hierarchical arrangement of triplets based on the mapping rules.

22. The computer-readable medium of claim 21, wherein the step of mapping at least some of the triplets in the first hierarchical arrangement to produce a second hierarchical arrangement of triplets according to the target language includes the steps of:

accessing the sequence of mapping rules to find a source triplet in the first hierarchical arrangement of triplets that matches the triplet according to the source language of an accessed mapping rule;

generating a target triplet based on the corresponding triplet according to target language; and producing the second hierarchical arrangement based on the target triplet.

23. The computer-readable medium of claim 19, wherein:

the triplets include references to at least some of the dictionary entries; and the step of constructing the target signal based on the second internal representation and the dictionary entries includes the steps of:

traversing the second hierarchical arrangement of triplets;

while traversing the second hierarchical, accessing the dictionary to identify target word forms based on the references to at least some of the dictionary entries.

24. The computer-readable medium of claim 13, wherein the step of analyzing includes the step of identifying special word formations.

* * * * *